US010386629B2

(12) United States Patent
Lin et al.

(10) Patent No.: US 10,386,629 B2
(45) Date of Patent: Aug. 20, 2019

(54) LIGHT-ENHANCEMENT DEVICE, AND APPLIANCE HAVING THE SAME

(71) Applicant: Lextar Electronics Corporation, Hsinchu (TW)

(72) Inventors: Chih-Hao Lin, Taipei (TW); Hui-Ru Wu, Miaoli County (TW); Jo-Hsiang Chen, New Taipei (TW); Tzong-Liang Tsai, Taichung (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/729,649

(22) Filed: Oct. 10, 2017

(65) Prior Publication Data
US 2018/0106994 A1  Apr. 19, 2018

(30) Foreign Application Priority Data
Oct. 18, 2016  (TW) .............................. 105133568 A

(51) Int. Cl.
| | |
|---|---|
| *F21V 9/30* | (2018.01) |
| *G02B 5/26* | (2006.01) |
| *G02B 5/28* | (2006.01) |
| *G02B 26/00* | (2006.01) |
| *F21Y 115/10* | (2016.01) |

(52) U.S. Cl.
CPC .............. *G02B 26/008* (2013.01); *F21V 9/30* (2018.02); *G02B 5/26* (2013.01); *F21Y 2115/10* (2016.08); *G02B 5/285* (2013.01)

(58) Field of Classification Search
CPC ........ F21V 9/30; F21V 13/08; F21Y 2115/10; F21K 9/64; F21K 9/62; G02B 26/008; G02B 5/26; G02B 5/285
See application file for complete search history.

(56) References Cited

U.S. PATENT DOCUMENTS

| | | | | |
|---|---|---|---|---|
| 8,075,148 B2 * | 12/2011 | Nada | .................... | G02B 6/0023 362/293 |
| 8,350,453 B2 * | 1/2013 | Tran | ......................... | F21V 3/00 313/112 |

(Continued)

FOREIGN PATENT DOCUMENTS

| | | |
|---|---|---|
| TW | 201007250 A | 2/2010 |
| TW | 201406929 A | 2/2014 |

(Continued)

*Primary Examiner* — Peggy A Neils
(74) *Attorney, Agent, or Firm* — CKC & Partners Co., LLC

(57) ABSTRACT

A light-enhancement device includes a wavelength conversion member and a wavelength controlling element. The wavelength conversion member includes a light-transmissive substrate and wavelength conversion material which is disposed within the light-transmissive substrate for converting a portion of light with a first wavelength into another light with a second wavelength. The wavelength controlling element is disposed on a surface of the light-transmissive substrate for reflecting another portion of the light with the first wavelength into the light-transmissive substrate and enabling the portion of the light with the second wavelength to pass through the wavelength controlling element. A roughness of the surface of the light-transmissive substrate facing towards the wavelength controlling element is configured to be 0-1 μm.

16 Claims, 10 Drawing Sheets

(56) References Cited

U.S. PATENT DOCUMENTS

| | | | |
|---|---|---|---|
| 9,859,477 B2* | 1/2018 | Hawtof | H01L 33/507 |
| 2007/0240346 A1* | 10/2007 | Li | G09F 13/20 |
| | | | 40/544 |
| 2010/0328925 A1* | 12/2010 | Hoelen | F21V 14/08 |
| | | | 362/84 |
| 2014/0160726 A1* | 6/2014 | Chen | F21V 3/02 |
| | | | 362/84 |
| 2015/0124456 A1* | 5/2015 | Hikmet | F21V 3/04 |
| | | | 362/293 |
| 2017/0235127 A1* | 8/2017 | Sprague | B29C 45/0001 |
| | | | 362/84 |

FOREIGN PATENT DOCUMENTS

| | | |
|---|---|---|
| TW | 201520670 A | 6/2015 |
| TW | 201536712 A | 10/2015 |
| TW | 201630211 A | 8/2016 |

\* cited by examiner

LIGHT-ENHANCEMENT DEVICE, AND APPLIANCE HAVING THE SAME

RELATED APPLICATIONS

This application claims priority to Taiwan Application Serial Number 105133568, filed Oct. 18, 2016, which is herein incorporated by reference.

BACKGROUND

Field of Present Disclosure

The present disclosure relates to a light-enhancement device. More particularly, the present disclosure relates to a light-enhancement device, and an appliance having the light-enhancement device.

Description of Related Art

Typically, fluorescence powders are used in the packaging process of light-emitting diodes (LEDs). For example, in addition to a conventional method in which the fluorescence powders being mixed into an encapsulation body, fluorescence powders also can be co-sintered onto a light-transmissive plate (e.g., glass or ceramic), such that the light-transmissive plate can be combined with the LEDs.

However, the efficiency of the fluorescence powders may be decreased because the fluorescence powders are processed in high temperature (e.g., 500° C.) during the co-sintering process. Thus, the amount of the fluorescence powders needs to be increased in the co-sintering process for maintaining the expected efficiency of the fluorescence powders. Hence, not only the manufacturing cost may be increased, but also the illumination performance of the packaged LEDs may be decreased because of the concentration of the fluorescence powders being overly high.

Therefore, how to effectively overcome the aforementioned inconvenience and shortages is a serious concern for this industry.

SUMMARY

An aspect of the present disclosure is to provide a light-enhancement device, and an appliance having the light-enhancement device to overcome the defects and inconvenience of the prior art.

According to one embodiment, the light-enhancement device includes a wavelength conversion member and a wavelength controlling element. The wavelength conversion member includes a light-transmissive substrate and wavelength conversion material. The wavelength conversion material is disposed within the light-transmissive substrate, and converts a portion of light with a first wavelength into another light with a second wavelength. The wavelength controlling element is disposed on a surface of the light-transmissive substrate, and reflects another portion of the light with the first wavelength back into the light-transmissive substrate, and enables the another light with the second wavelength to pass through the wavelength controlling element. The roughness of the surface of the light-transmissive substrate facing towards the wavelength controlling element is configured to be 0-1 μm.

In one or more embodiments of the present disclosure, the wavelength controlling element is a single-layer structure.

In one or more embodiments of the present disclosure, the wavelength controlling element includes at least one double-layer structure having a first optical film and a second optical film which are stacked on each other. The first optical film is sandwiched between the wavelength conversion member and the second optical film.

In one or more embodiments of the present disclosure, the light-enhancement device further includes a reflective metal layer disposed on a surface of the second optical film opposite to the wavelength conversion member, and the reflectivity of the reflective metal layer is greater than the reflectivity of the second optical film.

In one or more embodiments of the present disclosure, the wavelength controlling element further includes a light-transmissive metallic layer. The light-transmissive metallic layer is disposed on a surface of the double-layer structure opposite to the wavelength conversion member.

In one or more embodiments of the present disclosure, the light-enhancement device further includes a reflective metal layer disposed on a surface of the light-transmissive metallic layer opposite to the wavelength conversion member, and the reflectivity of the reflective metal layer is greater than the reflectivity of the light-transmissive metallic layer.

In one or more embodiments of the present disclosure, the wavelength controlling element is selected from the group consisting of titanium dioxide ($TiO_2$), silicon dioxide ($SiO_2$), aluminum oxide ($Al_2O_3$), zirconium oxide ($ZrO_2$), tritium pentoxide ($Ti_3O_5$), tantalum pentoxide ($Ta_2O_5$), magnesium fluoride ($MgF_2$), hafnium oxide ($HfO_2$), aluminum (Al), titanium (Ti), silver (Ag) and gold (Au).

In one or more embodiments of the present disclosure, a hardness of the light-transmissive substrate is at least 5 on a Mohs hardness scale.

In one or more embodiments of the present disclosure, the wavelength conversion member is provided with a first engagement portion. The first engagement portion is located on a surface of the wavelength conversion member opposite to the wavelength controlling element.

In one or more embodiments of the present disclosure, the roughness of the surface of the light-transmissive substrate facing towards the wavelength controlling element is further configured to be 0-0.3 μm.

According to another embodiment, the light emitting element includes a light emitting diode chip having a light emitting surface, and the aforementioned light-enhancement device covering the light emitting surface of the light emitting diode chip.

According to another embodiment, the light emitting module includes a base, a light emitting diode chip, the aforementioned light-enhancement device and an interposed layer. The base is provided with a reflective recess. The light emitting diode chip is disposed in the reflective recess. The aforementioned light-enhancement device covers the reflective recess. The interposed layer is arranged between the light-enhancement device and the light emitting diode chip.

In one or more embodiments of the present disclosure, the interposed layer includes one of gas, oil and encapsulant.

In one or more embodiments of the present disclosure, the wavelength conversion member is provided with a first engagement portion. The base is provided with a second engagement portion. Thus, the light-enhancement device covering the reflective recess is fixed on the base through the second engagement portion engaged with the first engagement portion.

According to another embodiment, a color wheel includes a wheel body, the aforementioned light-enhancement device and a bonding adhesive layer. The wheel body has a pivot portion and a reflection substrate surrounding the pivot portion. The bonding adhesive layer bonds the reflective metal layer of the aforementioned light-enhancement device and the reflection substrate.

To sum up, by increasing the reuse efficiency of wavelength conversion material, the light-enhancement device, the light emitting element and the light emitting module of the embodiment do not require to increase the amount of the wavelength conversion material, thereby reducing the production cost, reducing the light loss due to the high concentration of the wavelength conversion material, and prolonging the operation life of the light emitting module.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Figure 1A:
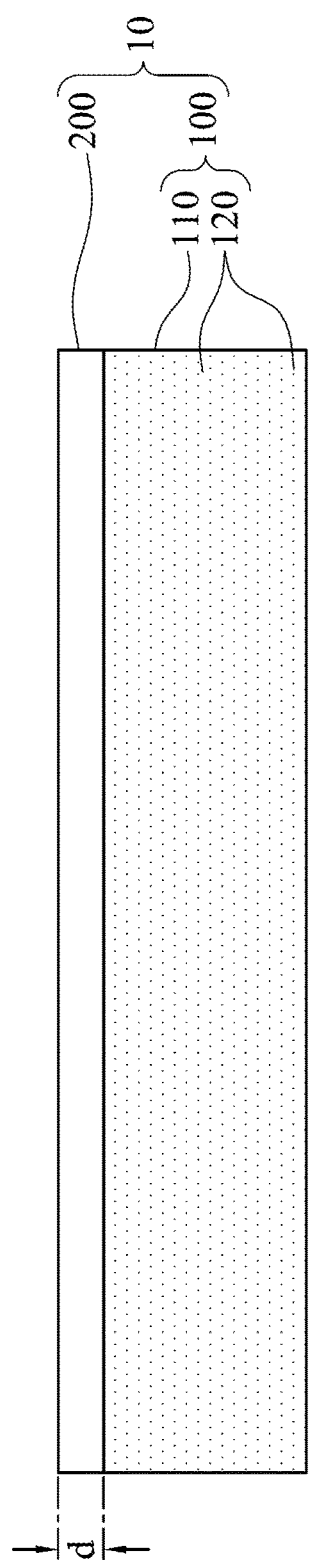
FIG. 1A is a schematic side view of a light-enhancement device according to a first embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

First Embodiment

Figure 1B:
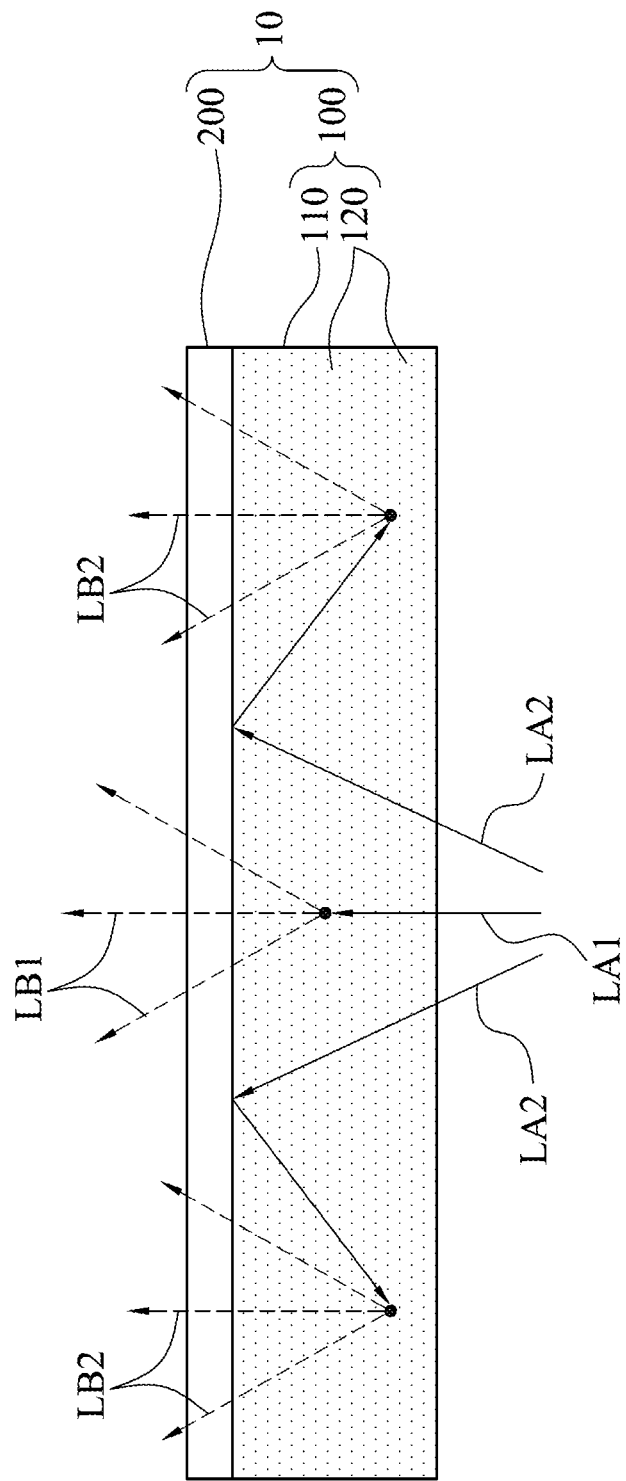
FIG. 1B is a schematic view of the light-enhancement device of FIG. 1A being irradiated by lights.

Reference is now made to FIG. 1A and FIG. 1B, in which FIG. 1A is a schematic side view of a light-enhancement device 10 according to a first embodiment of the present disclosure, and FIG. 1B is a schematic view of the light-enhancement device 10 of FIG. 1A being irradiated by light. As shown in FIG. 1A and FIG. 1B, in the embodiment, the light-enhancement device 10 includes a wavelength conversion member 100 and a wavelength controlling element 200 laminated on the wavelength conversion member 100. The wavelength conversion member 100 includes a light-transmissive substrate 110 and wavelength conversion material 120. The wavelength conversion material 120 is distributed within the light-transmissive substrate 110, and the wavelength conversion material 120 can convert a portion of light with a first wavelength into another light with a second wavelength. The wavelength controlling element 200 is disposed on a surface of the light-transmissive substrate 110, and the wavelength controlling element 200 can reflect another portion of the light with the first wavelength back into the light-transmissive substrate 110, and enable the another light with the second wavelength to pass through the wavelength controlling element 200.

Therefore, as shown in FIG. 1B, when the first light (e.g., blue light or UV light) with a first wavelength (e.g., 300 nm-480 nm) enters the wavelength conversion member 100, a portion of the first light (LA1) is converted into second light (e.g., white light or monochromatic light) LB1 with a second wavelength by the aforementioned wavelength conversion material 120, so that the second light LB1 enters the wavelength controlling element 200 from the light-transmissive substrate 110. On the other hand, when another portion of the first light (LA2) which is not converted into the second light LB1 enters the wavelength controlling element 200 through the light-transmissive substrate 110, the another portion of the first light (LA2) cannot pass through the wavelength controlling element 200 due to wavelength limitations, and can be reflected back into the light-transmissive substrate 110 by the wavelength controlling element 200 instead, so as to further increase the possibilities of the first light (LA2) being converted into second light (LB2) with the second wavelength.

Therefore, by increasing the reuse efficiency of the wavelength conversion material 120, the light-enhancement device 10 of the aforementioned embodiment can maintain the expected illumination performance of the light-enhancement device 10, and is not required to choose increasing the amount of the wavelength conversion material, thereby reducing the production cost, reducing the light loss due to the high concentration of the wavelength conversion material 120, and prolonging the operation life of the light emitting module.

Specifically, the light-transmissive substrate 110 is formed from inorganic material such as glass, quartz, sapphire, etc. A hardness of the light-transmissive substrate 110 is at least 5 on a Mohs hardness scale or greater than 5 on the Mohs hardness scale. The roughness of the light-transmissive substrate 110 is about 0-1 μm or 0-0.3 μm, and more particularly, the roughness of a surface of the light-transmissive substrate 110 facing towards the wavelength controlling element 200 is 0-1 μm or 0-0.3 μm. The wavelength conversion material 120 is, for example, an inorganic fluorescent material, such as YAG, LuAG, Silicate, Nitride, Oxynitride, Sulfide, Fluoride, TAG, NBG, β-SiAlON, α-SiAlON, Mn2+, Mn4+, etc. However, the present disclosure is not limited to those types, variables and ranges.

Furthermore, the wavelength controlling element 200 is, for example, an optical coating layer with an optical transmittance less than 10% to the first light. In the embodiment, the wavelength controlling element 200 is selected from the group consisting of titanium dioxide (TiO2), silicon dioxide (SiO2), aluminum oxide (Al2O3), zirconium oxide (ZrO2), tritium pentoxide (Ti3O5), tantalum pentoxide (Ta2O5), magnesium fluoride (MgF2), hafnium oxide (HfO2), aluminum (Al), titanium (Ti), silver (Ag) and gold (Au). However, the present disclosure is not limited thereto.

It is noted that the aforementioned wavelength controlling element 200 can be formed on the light-transmissive substrate 110 by, for example, plating, sputtering, vapor deposition, or laser plating. However, the present disclosure is not limited thereto.

In this embodiment, the wavelength controlling element 200 disposed on the light-transmissive substrate 110 is a single-layer structure, that is, the wavelength controlling element 200 is formed as a layer structure of one single kind of material. Since a refractive index of the wavelength controlling element 200 and a refractive index of the wavelength conversion member 100 are different to each other, by setting the wavelength controlling element 200 with a specific thickness, the first light (LA2) cannot pass through the single-layer structure, and can be reflected back into the wavelength conversion member 100 so as to further increase the possibilities of the first light (LA2) being converted into second light (LB2) with the second wavelength.

For example, in this embodiment, the aforementioned wavelength controlling element 200 can be fabricated according to the following relationship:

$$d = \lambda/4n$$

where the thickness of the wavelength controlling element is d, the first wavelength is $\lambda$, and the refractive index of the wavelength controlling element is n.

Second Embodiment

Figure 2A:
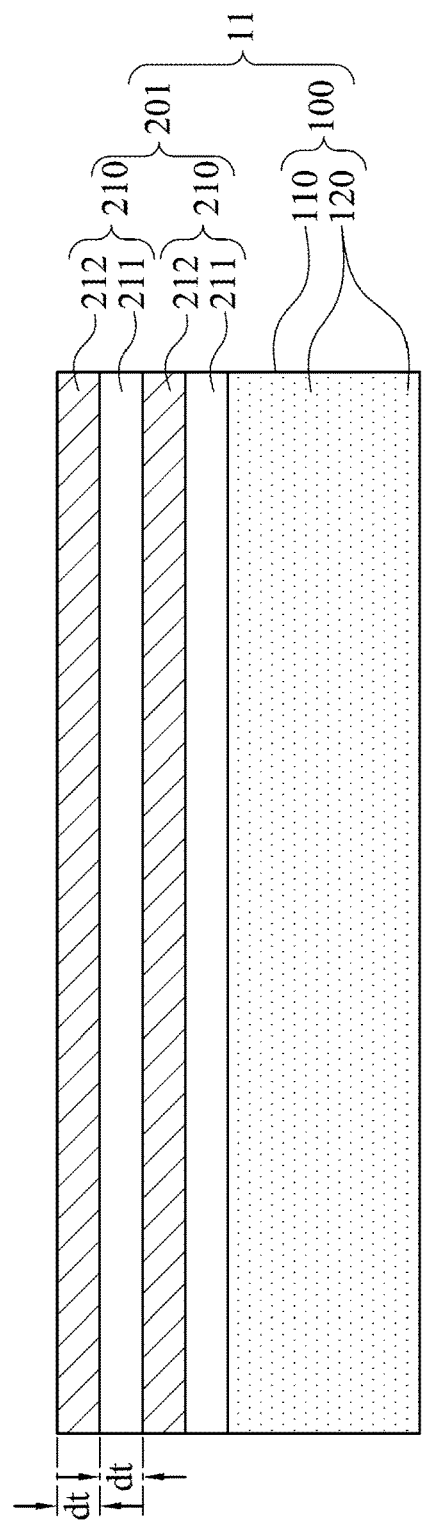
FIG. 2A is a schematic side view of a light-enhancement device according to a second embodiment of the present disclosure.

FIG. 2A is a schematic side view of a light-enhancement device 11 according to a second embodiment of the present disclosure. As shown in FIG. 2A, the light-enhancement device 11 of FIG. 2A is substantially the same as the light-enhancement device 10 of FIG. 1 of the first embodiment, except that the wavelength controlling element 201 disposed on the light-transmissive substrate 110 includes at least one double-layer structure 210, rather than a single-layer structure. The double-layer structure 210 is a stacked structure with two types of materials.

The double-layer structure 210 includes a first optical film 211 and a second optical film 212 which are stacked with each other. The first optical film 211 is sandwiched between the second optical film 212 and the wavelength conversion member 100. The first optical film 211 and the second optical film 212 are formed from light-permeable dielectric materials. For example, the first optical film 211 includes titanium dioxide (TiO2), and a refractive index of the first optical film 211 is, for example, 2.4. The second optical film 212 includes silicon dioxide (SiO2), and a refractive index of the second optical film 212 is, for example, 1.4, however, the present disclosure is not limited thereto.

When the wavelength controlling element 201 includes two of the double-layer structures 210, that is, the wavelength controlling element 201 is a stacked structure of Distributed Bragg Reflector (DBR), the stacked structure of DBR includes a number of first optical films 211 and second optical films 212. The first optical films 211 and the second optical films 212 are alternately laminated on the light-transmissive substrate 110 in an order of one of the first optical films 211 and one of the second optical films 212, and one of the first optical films 211 is in direct contact with one surface of the light-transmissive substrate 110. The refractive index of each of the first optical films 211 and the refractive index of each of the second optical films 212 are different, and the wavelength conversion member 100, each of the first optical films 211 and each of the second optical films 212 have different refractive indices. The refractive indices of the first optical films 211 are substantially the same. The refractive indices of the second optical films 212 are substantially the same.

Therefore, since the refractive indices of the wavelength conversion member 100, the first optical films 211 and the second optical films 212 are different from one another, by setting the wavelength controlling element 201 with a specific thickness, even when the light with specific wavelengths enters the first optical film 211 or the second optical film 212 of the double-layer structures 210 through the wavelength conversion member 100, the light with the specific wavelengths still can be gradually reflected back into the wavelength conversion member 100 by the subsequent first optical films 211 or second optical films 212 so as to further increase the possibilities of being converted into light with another wavelength.

Specifically, in this embodiment, the aforementioned first optical films 211 or the second optical films 212 can be fabricated according to the following relationship:

$$dt = \lambda/4nt$$

where a thickness of the first optical film 211 or the second optical film 212 is dt, the first wavelength is $\lambda$, and the refractive index of the first optical film 211 or the second optical film 212 is nt.

Figure 2B:
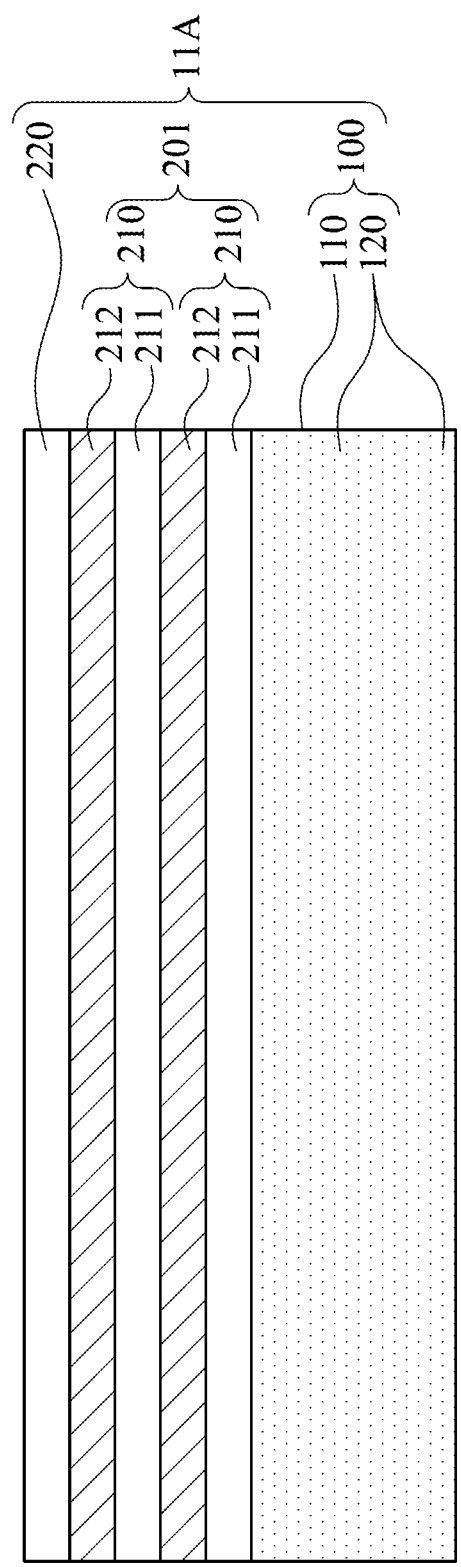
FIG. 2B is a schematic side view of a light-enhancement device according to one modified example of the second embodiment of the present disclosure.

FIG. 2B is a schematic side view of a light-enhancement device 11A according to one modified example of the second embodiment of the present disclosure. As shown in FIG. 2B, the light-enhancement device 12 of FIG. 2B is substantially the same as the light-enhancement device 11 of FIG. 2A of the second embodiment, except that, the light-enhancement device 11A further includes a reflective metal layer 220 disposed on an outer surface of one of the double-layer structures 210 farthest away from the wavelength conversion member 100. Specifically, the reflective metal layer 220 is disposed on a surface of one of the second optical films 212 opposite to the wavelength conversion member 100. Furthermore, the reflectivity of the reflective metal layer 220 is greater than the reflectivity of the second optical film 212 which is directly contacted with the reflective metal layer 220. For example, the reflective metal layer 220 includes materials with highly reflective performance, such as aluminum (Al) or silver (Ag).

Third Embodiment

Figure 3A:
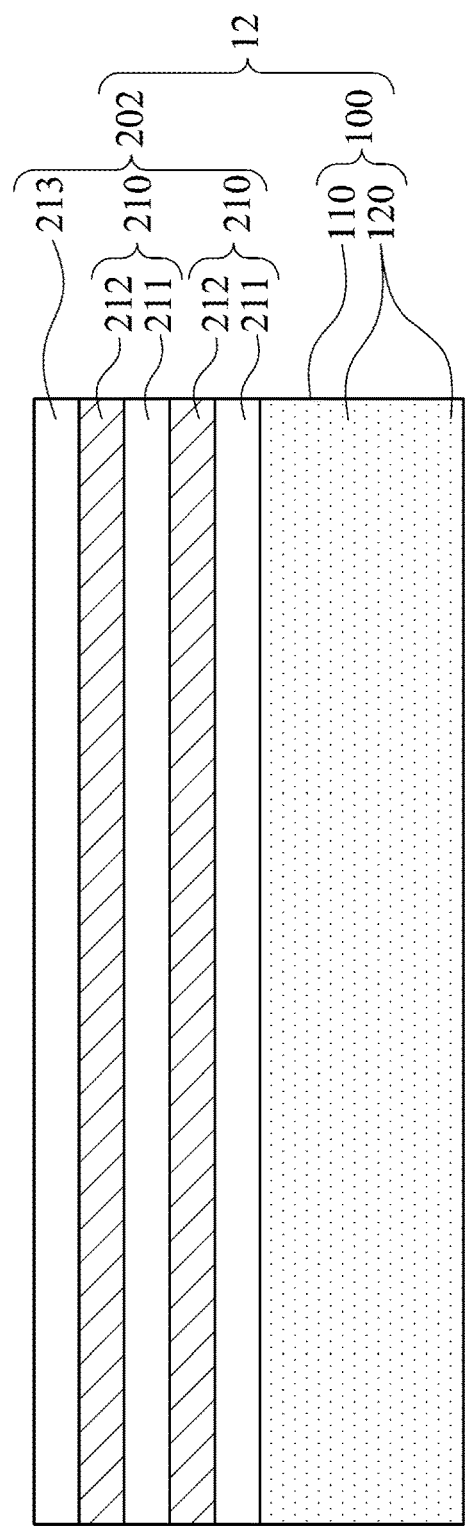
FIG. 3A is a schematic side view of a light-enhancement device according to a third embodiment of the present disclosure.

FIG. 3A is a schematic side view of a light-enhancement device 12 according to a third embodiment of the present disclosure. As shown in FIG. 3A, the light-enhancement device 12 of FIG. 3A is substantially the same as the light-enhancement device 11 of FIG. 2A of the second embodiment, except that, the wavelength controlling element 202 further includes a light-transmissive metallic layer 213. The light-transmissive metallic layer 213 is disposed on a surface of the double-layer structure 210 opposite to the wavelength conversion member 100, that is, the light-transmissive metallic layer 213 is disposed on an outer surface of one of the second optical films 212 of the double-layer structure 210 which is furthest away from the wavelength conversion member 100, so as to guide the light with the specific wavelength back into the wavelength conversion member 100, and increase the possibilities of being converted into light with another wavelength.

Namely, when the wavelength controlling element 202 is a stacked structure of omni-directional reflector (ODR), the stacked structure of ODR can have a high reflectivity for incident light in all directions. The light-transmissive metallic layer 213 is formed by vapor deposition, for example, for enhancing the total reflection efficiency.

For example, the light-transmissive metallic layer 213 includes, for example, silver, aluminum or the like. However, the present disclosure is not limited to those described materials, other materials which can provide suitable total reflection are also within the scope of the present disclosure to be protected.

Figure 3B:
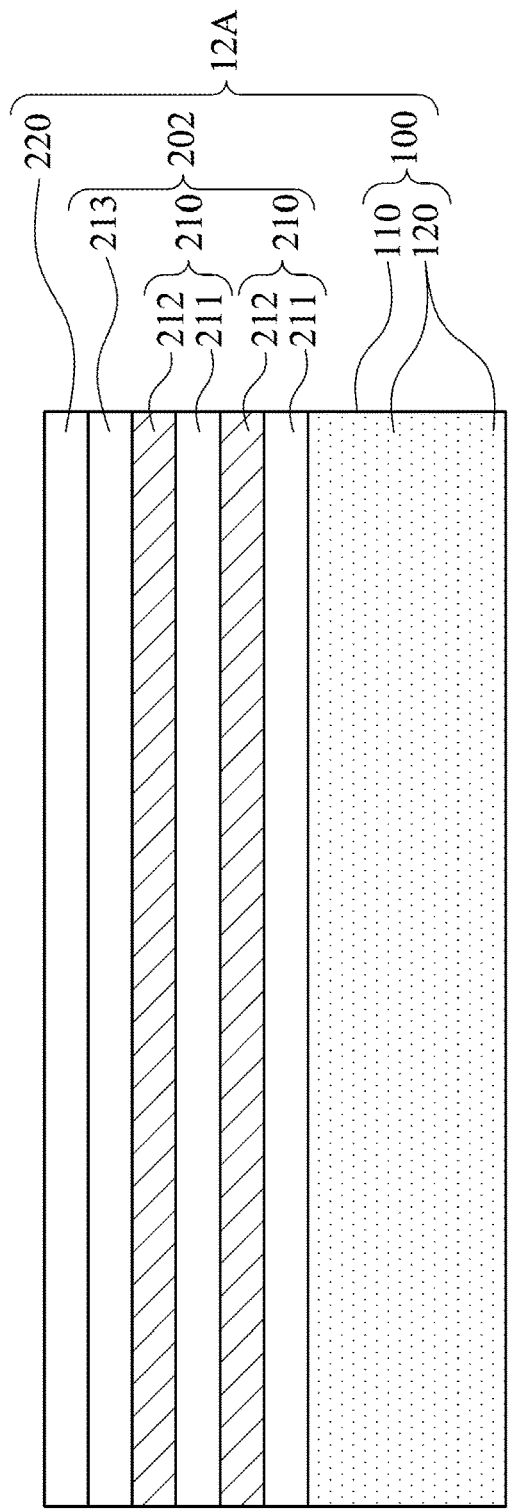
FIG. 3B is a schematic side view of a light-enhancement device according to one modified example of the third embodiment of the present disclosure.

FIG. 3B is a schematic side view of a light-enhancement device 12A according to one modified example of the third embodiment of the present disclosure. As shown in FIG. 3B, the light-enhancement device 12A of FIG. 3B is substantially the same as the light-enhancement device 12 of FIG. 3A of the third embodiment, except that, the light-enhancement device 12A further includes a reflective metal layer 220 disposed on an outer surface of the light-transmissive metallic layer 213 opposite to the wavelength conversion member 100, and the reflectivity of the reflective metal layer 220 is greater than the reflectivity of the light-transmissive metallic layer 213. For example, the reflective metal layer 220 includes materials with highly reflective performance, such as aluminum (Al) or silver (Ag).

Fourth Embodiment

Figure 4:
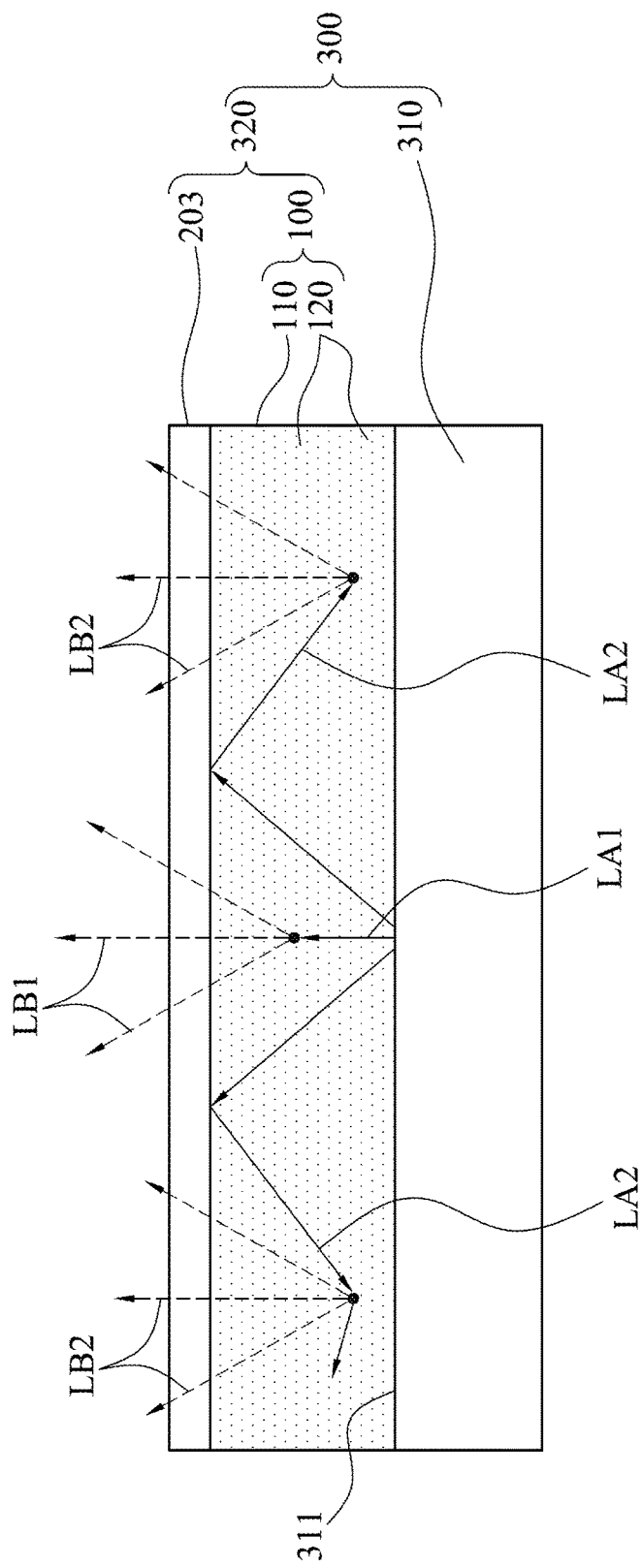
FIG. 4 is a schematic side view showing a light-movement diagram of a light emitting element according to a fourth embodiment of the present disclosure.

FIG. 4 is a schematic side view showing a light-movement diagram of a light emitting element 300 according to a fourth embodiment of the present disclosure. As shown in FIG. 4, the light emitting element 300 includes a light emitting diode chip 310 and a light-enhancement device 320. The light-enhancement device 320 of FIG. 4 is substantially the same as one of the light-enhancement devices 10, 11, 12 of FIG. 1A, FIG. 1B, FIG. 2A, and FIG. 3A. The light emitting diode chip 310 is provided with a light emitting surface 311 for emitting light LA1. The light-enhancement device 320 covers the light emitting surface 311. For example, the light-enhancement device 320 is adhered on the light emitting surface 311 with an adhesive (not shown in figures). The light emitting diode chip 310 is a blue-ray light emitting diode or a UV ray light emitting diode, for example.

Therefore, when the light emitting diode chip 310 emits the first light (LA1) (e.g., blue light or UV light) with a first wavelength (e.g., 300 nm-480 nm) into the wavelength conversion member 100 from the light emitting surface 311, a portion of the first light (LA1) is converted into second light LB1 with the second wavelength by the aforementioned wavelength conversion material 120, such that the second light LB1 enters the wavelength controlling element 203 from the light-transmissive substrate 110. On the other hand, when another portion of the first light (LA2) which is not converted into the second lights LB1 enters the wavelength controlling element 200 through the light-transmissive substrate 110, the another portion of the first light (LA2) cannot pass through the wavelength controlling element 203 due to wavelength limitations, and can be reflected back into the light-transmissive substrate 110 by the wavelength controlling element 203 instead, so as to further increase the possibilities of the first light (LA2) being converted into second light (LB2) with the second wavelength.

Fifth Embodiment

Figure 5:
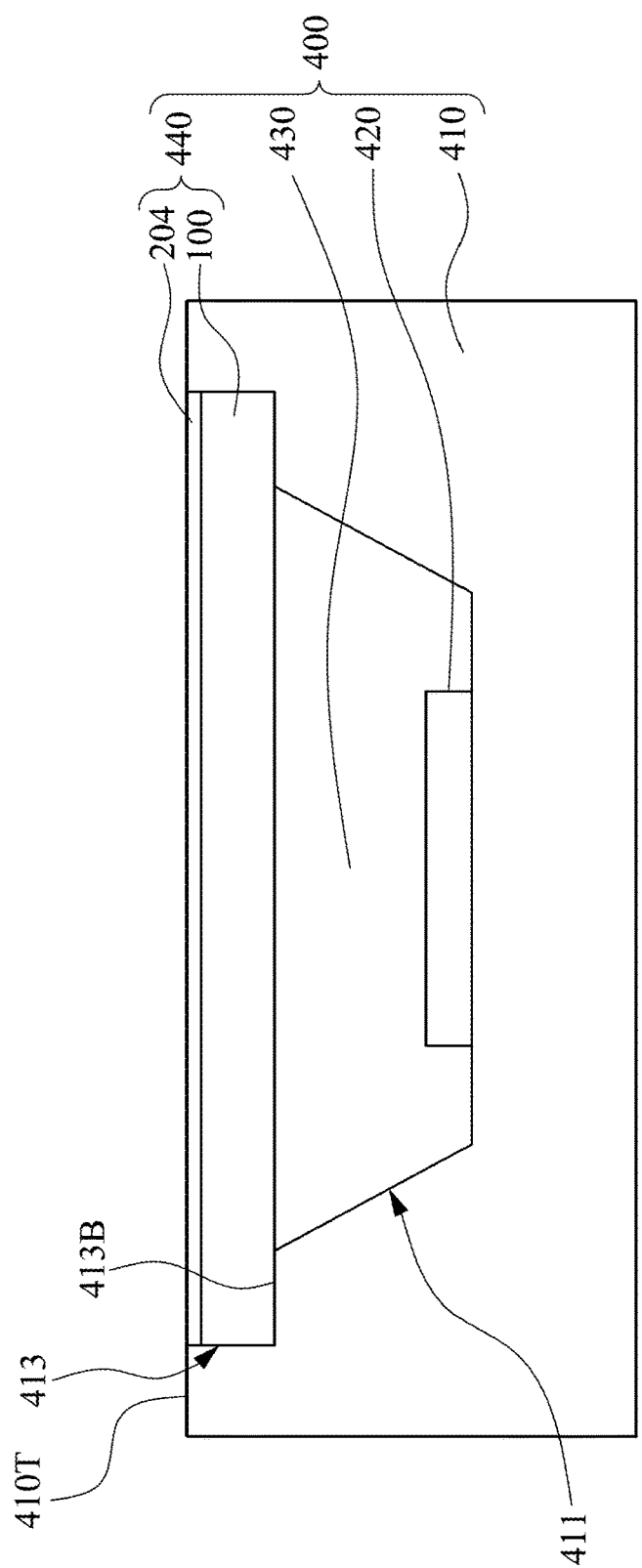
FIG. 5 is a cross-sectional view of a light emitting module according to a fifth embodiment of the present disclosure.

FIG. 5 is a schematic cross-sectional view of a light emitting module 400 according to a fifth embodiment of the present disclosure. As shown in FIG. 5, the light emitting module 400 includes a base 410, a light emitting diode chip 420, an interposed layer 430, and a light-enhancement device 440. The light-enhancement device 440 of FIG. 5 is substantially the same as one of the light-enhancement device 10, 11, 12 of FIG. 1A, FIG. 1B, FIG. 2A, and FIG. 3A. One surface (e.g., top surface 410T) of the base 410 is provided with a reflective recess 411. The light emitting diode chip 420 is disposed in the reflective recess 411. The light emitting diode chip 420, for example, is a blue-ray light emitting diode or a UV ray light emitting diode. However, the present disclosure is not limited to the types, variables and ranges. The aforementioned light-enhancement device 440 is disposed on the top surface 410T of the base 410, and covers the reflective recess 411. The wavelength controlling element 204 of the aforementioned light-enhancement device 440 is located opposite to the light emitting diode chip 420. For example, the aforementioned light-enhancement device 440 fully covers the reflective recess 411. The interposed layer 430 is arranged between the light emitting diode chip 420 and the aforementioned light-enhancement device 440. In more detail, the interposed layer 430 can be gas, oil or encapsulant, and is fully filled in the reflective recess 411.

In the embodiment, for example, the base 410 is provided with a depressed portion 413, and the depressed portion 413 is formed on the top surface 410T of the base 410. The depressed portion 413 surrounds the reflective recess 411, and is connected to the reflective recess 411. A depth of the depressed portion 413 is smaller than a depth of the reflective recess 411. The aforementioned light-enhancement device 440 is exactly inserted into the depressed portion 413, and covers the reflective recess 411. Specifically, one surface of the aforementioned light-enhancement device 440 is in direct contact with a bottom portion 413B of the depressed portion 413, and the opposite surface of the aforementioned light-enhancement device 440 is aligned with the top surface 410T of the base 410.

Sixth Embodiment

Figure 6:
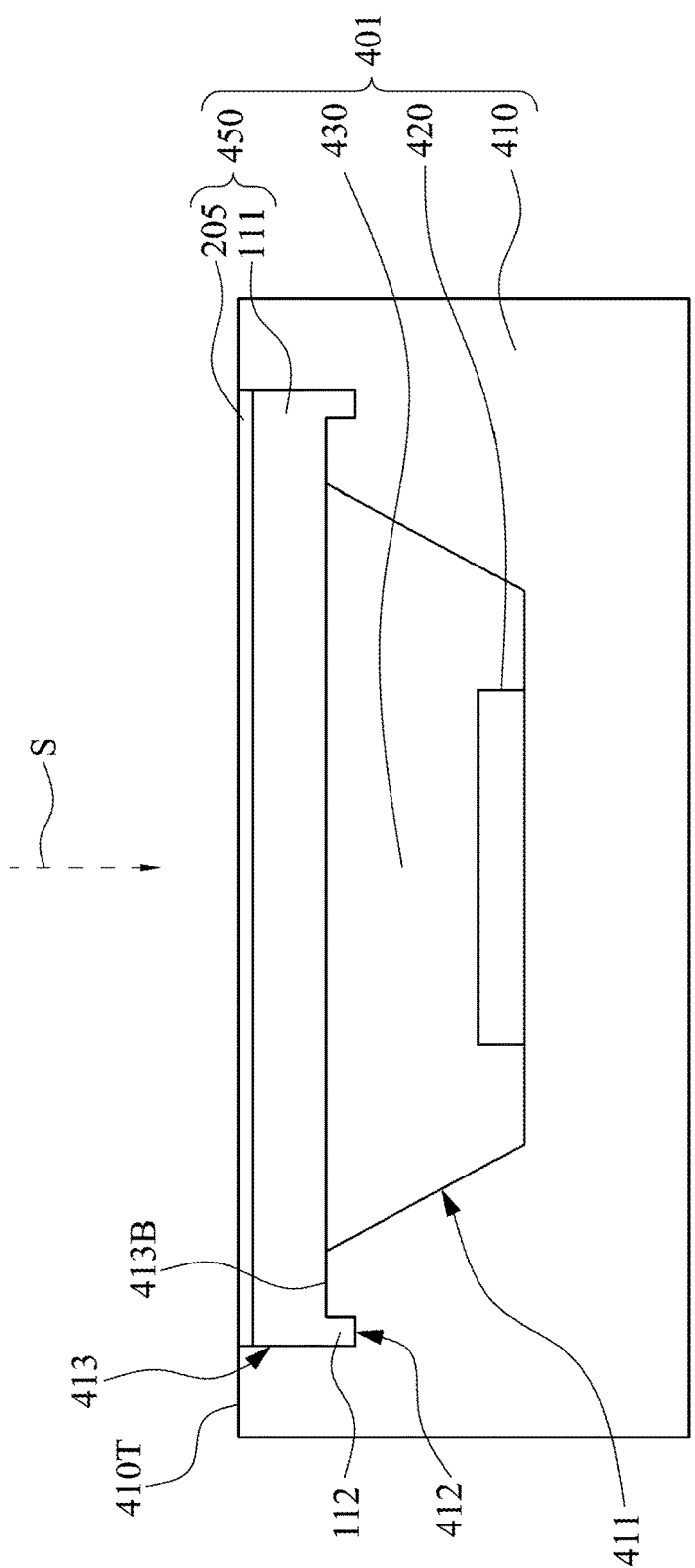
FIG. 6 is a cross-sectional view of a light emitting module according to a sixth embodiment of the present disclosure.

FIG. 6 is a schematic cross-sectional view of a light emitting module 401 according to a sixth embodiment of the present disclosure. As shown in FIG. 6, the light emitting module 401 of FIG. 6 is substantially the same as the light emitting module 400 of FIG. 5 of the fifth embodiment, except that the light-enhancement device 450 of the light emitting module 401 is held on the base 410 by a mechanical design. Specifically, the light-transmissive substrate 111 is provided with two first engagement portions 112. The first engagement portions 112 are disposed on a surface of the light-transmissive substrate 111 opposite to the wavelength controlling element 205, and the first engagement portions 112 are arranged symmetrically and separately on the surface of the light-transmissive substrate 111. Each of the first engagement portions 112, for example, is shaped as a linear rib or a bump. The first engagement portions 112 in the embodiment are integrally formed with the light-transmissive substrate 111, but the disclosure is not limited thereto.

The base 410 is provided with two second engagement portions 412. Each of the second engagement portions 412 is shaped as a linear or a point recess, for example. The second engagement portions 412 are concavely formed on the bottom portion 413B of the depressed portion 413, separately. The second engagement portions 412 are respectively located at two opposite sides of the reflective recess 411. The Number and shape of each of the first engagement portions 112 is matched with the Number and shape of each of the second engagement portions 412. Each of the second engagement portions 412 is matched with each of the first engagement portions 112 in the quantity and shape.

Therefore, when the light-enhancement device 450 is assembled with the base 410 in a downward direction S (i.e., from the top to the bottom), the light-enhancement device 450 exactly sinks into the depressed portion 413 and covers the reflective recess 411 through the first engagement portions 112 which are respectively inserted into and fixed in the second engagement portions 412. At this moment, the wavelength controlling element 205 and the light emitting diode chip 420 are located oppositely, and the interposed layer 430 is interposed between the light emitting diode chip 420 and the aforementioned light-enhancement device 205. It is noted that, the disclosure is not limited to whether the light-enhancement device 450 is assembled with the base 410 with adhesive.

Also, the disclosure is not limited that the number of the first engagement portions and the second engagement portions must be two, in another embodiment, the first engagement portion and the second engagement portion also can be a single continuous surrounded body, respectively.

Conventionally, a phosphor layer of a traditional reflective color wheel is directly bonded on a reflection substrate with an Au/Sn coating so that the traditional reflective color wheel is able to receive and reflect laser beams. However, since the Au/Sn coating absorbs laser beams, the effective reflection performance of the reflection substrate of the traditional reflective color wheel might be reduced so as to cause serious light loss.

Figure 7B:
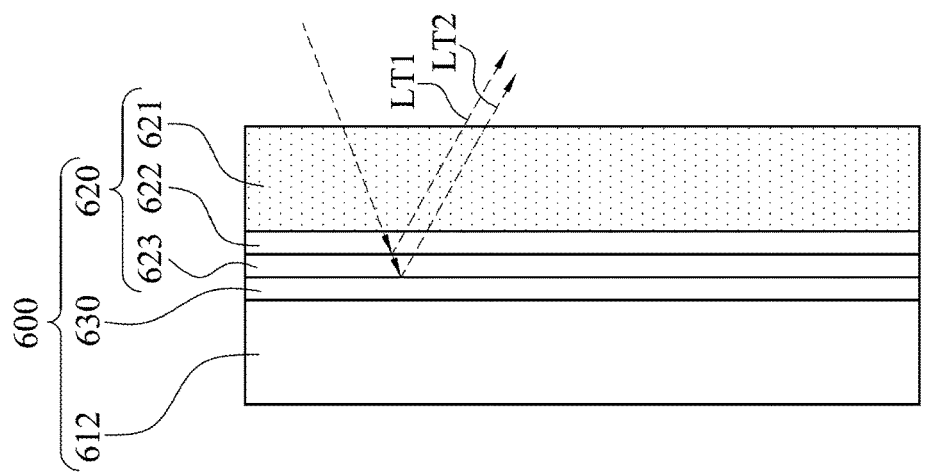
FIG. 7B is a cross sectional view of FIG. 7A taken along a line A-A.
Figure 7A:
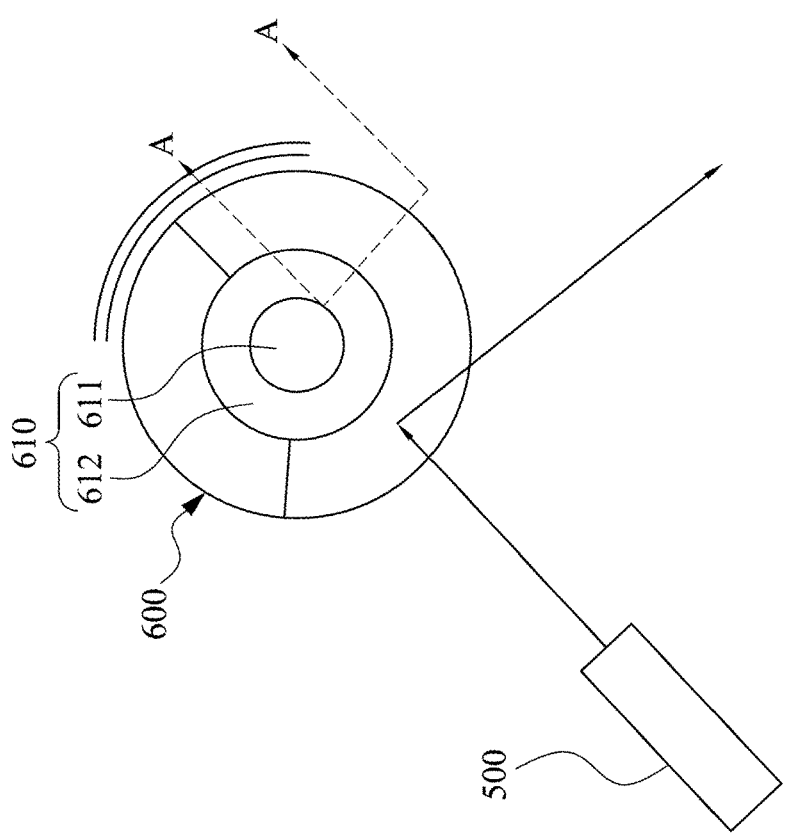
FIG. 7A is a schematic view showing a light source emitting lights towards a color wheel according to a seventh embodiment of the present disclosure.

Reference is now made to FIG. 7A and FIG. 7B in which FIG. 7A is a schematic view showing a light source 500 emitting lights to a color wheel 600 according to a seventh embodiment of the present disclosure, and FIG. 7B is a cross sectional view of FIG. 7A taken along a line A-A. The color wheel 600 includes a wheel body 610, a light-enhancement device 620 and a bonding adhesive layer 630. The wheel body 610 is rotatable relative to the light source 500, and the wheel body 610 is provided with a pivot portion 611 and a reflection substrate 612 surrounding the pivot portion 611. The reflection substrate 612, for example, includes metal with high reflective performance such as Al. The bonding adhesive layer 630 bonds the light-enhancement device 620 and the reflection substrate 612 so that the light-enhancement device 620 is moved along with the wheel body 610. Specifically, the light-enhancement device 620 includes a wavelength conversion member 621, a wavelength controlling element 622 and a reflective metal layer 623. The wavelength controlling element 622 is sandwiched between the wavelength conversion member 621 and the reflective metal layer 623. In the embodiment, for example, the wavelength conversion member 621 can be, but not being limited to, a phosphor glass or a phosphor ceramics.

In the embodiment, the light-enhancement device 620 is substantially the same as one of the light-enhancement device 11A and 12A of FIG. 2B and FIG. 3B. The bonding adhesive layer 630 bonds the reflective metal layer 623 and the reflection substrate 612 of the wheel body 610. For example, the bonding adhesive layer 630 includes materials of Au/Sn.

Therefore, when incident lights from the light source 500 enter the color wheel 600 through the wavelength conversion member 621, the wavelength controlling element 622 and the reflective metal layer 623 sequentially, a first portion LT1 of the incident lights is reflected outwards from the wavelength conversion member 621 by the wavelength controlling element 622, and after that, a second portion LT2 of the remaining incident lights is further reflected outwards from the wavelength conversion member 621 by the reflective metal layer 623.

Because the reflective metal layer 623 between the bonding adhesive layer 630 and the wavelength controlling element 622 can reflect the second portion LT2 of the remaining incident lights, the lights will not be absorbed by the bonding adhesive layer 630, so as to avoid serious light loss. Also, not only the portions LT1, LT2 of the incident lights reflected into the wavelength conversion member 621 can be converted into another light (e.g., white light or monochromatic light), but also light loss caused by the remaining incident lights reaching the bonding adhesive layer 630 can be reduced, thereby remaining the performance of the reflection lights.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims and their equivalents.

What is claimed is:

1. A light-enhancement device, comprising:
   a wavelength conversion member comprising a light-transmissive substrate and wavelength conversion material disposed within the light-transmissive substrate for converting a portion of light with a first wavelength into another light with a second wavelength; and
   a wavelength controlling element disposed on a surface of the light-transmissive substrate for reflecting another portion of the light having the first wavelength back into the light-transmissive substrate, and allowing the another light with the second wavelength to pass through the wavelength controlling element, wherein a roughness of the surface of the light-transmissive substrate facing towards the wavelength controlling element is configured to be 0-1 μm.

2. The light-enhancement device of claim 1, wherein the wavelength controlling element is a single-layer structure.

3. The light-enhancement device of claim 1, wherein the wavelength controlling element comprises at least one double-layer structure having a first optical film and a second optical film which are stacked on each other, and the first optical film is sandwiched between the wavelength conversion member and the second optical film.

4. The light-enhancement device of claim 3, further comprising:
   a reflective metal layer disposed on a surface of the second optical film opposite to the wavelength conversion member, wherein a reflectivity of the reflective metal layer is greater than a reflectivity of the second optical film.

5. The light-enhancement device of claim 3, wherein the wavelength controlling element further comprises a light-transmissive metallic layer, and the light-transmissive metallic layer is disposed on a surface of the double-layer structure opposite to the wavelength conversion member.

6. The light-enhancement device of claim 5, further comprising:
a reflective metal layer disposed on a surface of the light-transmissive metallic layer opposite to the wavelength conversion member, wherein a reflectivity of the reflective metal layer is greater than a reflectivity of the light-transmissive metallic layer.

7. The light-enhancement device of claim 1, wherein the wavelength controlling element is selected from the group consisting of Titanium dioxide (TiO2), silicon dioxide (SiO2), aluminum oxide (Al2O3), zirconium oxide (ZrO2), tritium pentoxide (Ti3O5), tantalum pentoxide (Ta2O5), magnesium fluoride (MgF2), hafnium oxide (HfO2), aluminum (Al), titanium (Ti), silver (Ag) and gold (Au).

8. The light-enhancement device of claim 1, wherein a hardness of the light-transmissive substrate is at least 5 on a Mohs hardness scale.

9. The light-enhancement device of claim 1, wherein the wavelength conversion member is provided with a first engagement portion, and the first engagement portion is located on one surface of the wavelength conversion member opposite to the wavelength controlling element.

10. The light-enhancement device of claim 1, wherein the roughness of the surface of the light-transmissive substrate facing towards the wavelength controlling element is further configured to be 0-0.3 μm.

11. A light emitting element, comprising:
a light emitting diode chip having a light emitting surface; and
a light-enhancement device of claim 1 covering the light emitting surface of the light emitting diode chip.

12. A light emitting module, comprising:
a base having a reflective recess;
a light emitting diode chip disposed in the reflective recess;
a light-enhancement device of claim 1 covering the reflective recess; and
an interposed layer arranged between the light-enhancement device and the light emitting diode chip.

13. The light emitting module of claim 12, wherein the interposed layer comprises one of gas, oil and encapsulant.

14. The light emitting module of claim 12, wherein the wavelength conversion member is provided with a first engagement portion; and the base is provided with a second engagement portion, wherein the light-enhancement device covering the reflective recess is fixed on the base through the second engagement portion engaged with the first engagement portion.

15. A color wheel, comprising:
a wheel body having a pivot portion and a reflection substrate surrounding the pivot portion;
a light-enhancement device of claim 4; and
a bonding adhesive layer bonding the reflective metal layer and the reflection substrate.

16. A color wheel, comprising:
a wheel body having a pivot portion and a reflection substrate surrounding the pivot portion;
a light-enhancement device of claim 6; and
a bonding adhesive layer bonding the reflective metal layer and the reflection substrate.

* * * * *